(12) United States Patent
Mehravaran et al.

(10) Patent No.: US 9,709,065 B2
(45) Date of Patent: Jul. 18, 2017

(54) SYSTEM AND METHOD FOR A TURBOCHARGER DRIVEN COOLANT PUMP

(71) Applicant: Ford Global Technologies, LLC, Dearborn, MI (US)

(72) Inventors: Meisam Mehravaran, Oak Park, MI (US); Robert Andrew Wade, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 14/534,722

(22) Filed: Nov. 6, 2014

(65) Prior Publication Data
US 2016/0131016 A1    May 12, 2016

(51) Int. Cl.
| | |
|---|---|
| *F01P 7/14* | (2006.01) |
| *F04D 25/04* | (2006.01) |
| *F02B 29/04* | (2006.01) |
| *F02B 37/18* | (2006.01) |
| *F04D 13/04* | (2006.01) |
| *F01P 5/12* | (2006.01) |
| *F01P 11/06* | (2006.01) |
| *F01P 3/20* | (2006.01) |
| *F01P 11/04* | (2006.01) |

(52) U.S. Cl.
CPC ............ *F04D 25/04* (2013.01); *F01P 5/12* (2013.01); *F02B 29/04* (2013.01); *F02B 29/0443* (2013.01); *F02B 29/0493* (2013.01); *F02B 37/18* (2013.01); *F04D 13/04* (2013.01); *F01P 3/20* (2013.01); *F01P 11/04* (2013.01); *F01P 11/06* (2013.01); *F01P 2007/146* (2013.01); *F01P 2060/02* (2013.01); *F01P 2060/12* (2013.01); *Y02T 10/144* (2013.01); *Y02T 10/146* (2013.01)

(58) Field of Classification Search
CPC .... F02P 3/20; F01P 11/04; F01P 11/06; F01P 2007/146; F01P 2060/08
USPC ...................................................... 123/41.1
See application file for complete search history.

(56) References Cited

U.S. PATENT DOCUMENTS

| | | |
|---|---|---|
| 4,541,784 A | 9/1985 | Hörler |
| 5,113,658 A | 5/1992 | Kobayashi |
| 6,604,360 B1 | 8/2003 | Vuk |
| 2003/0056772 A1 | 3/2003 | Borrmann et al. |
| 2006/0032225 A1* | 2/2006 | Dyne ............... F02B 37/10 60/607 |

(Continued)

FOREIGN PATENT DOCUMENTS

WO    2013118308 A1    8/2013

*Primary Examiner* — Hung Q Nguyen
*Assistant Examiner* — Charles Brauch
(74) *Attorney, Agent, or Firm* — Julia Voutyras; McCoy Russell LLP (57) ABSTRACT

Methods and a system are provided for powering a coolant pump to drive a coolant flow through a charge air cooler using exhaust gas-driven rotations of a turbocharger. In one example, a method may include adjusting a coolant flow through a charge air cooler with a coolant pump, the coolant pump mechanically driven by rotative power from a turbocharger. As such, coolant flow may increase with increasing turbocharger speed and the method may further include adjusting a wastegate of a turbocharger turbine to adjust power provided to the coolant pump.

15 Claims, 4 Drawing Sheets

(56) References Cited

U.S. PATENT DOCUMENTS

| | | | |
|---|---|---|---|
| 2010/0050634 A1* | 3/2010 | Yager | F02M 26/05 |
| | | | 60/605.2 |
| 2010/0083916 A1* | 4/2010 | Shintani | F01P 7/164 |
| | | | 123/41.1 |
| 2012/0180482 A1* | 7/2012 | Kapich | F02B 37/10 |
| | | | 60/608 |
| 2012/0297765 A1 | 11/2012 | Vigild et al. | |
| 2013/0276765 A1* | 10/2013 | Moffat | F02M 25/07 |
| | | | 123/568.12 |

* cited by examiner

SYSTEM AND METHOD FOR A TURBOCHARGER DRIVEN COOLANT PUMP

FIELD OF THE INVENTION

The field of the invention relates generally to a charge air cooler coolant circuit for an internal combustion engine.

BACKGROUND AND SUMMARY

Turbocharged and supercharged engines may be configured to compress ambient air entering the engine in order to increase power. Because compression of the air may cause an increase in air temperature, a charge air cooler (CAC; also referred to as an intercooler) may be employed to cool the heated air, thereby increasing the density of the air and further increasing the potential power of the engine. In one example, the CAC may be a liquid-cooled CAC with coolant flowing through internal cooling tubes of the CAC. As such, a coolant pump coupled to the CAC may be required to control coolant flow through the CAC and thus local CAC cooling. CACs may be used to maintain the charge air at a temperature low enough to increase combustion stability but high enough to reduce condensate formation within the CAC.

However, if overcooling by the CAC occurs, condensation (e.g., water droplets) may form on any internal surface of the CAC that is cooler than the dew point of the compressed air. During transient conditions, such as hard vehicle acceleration, these water droplets may be blown out of the CAC and into the combustion chambers of the engine resulting in increased potential for engine misfire, loss of torque and engine speed, and incomplete combustion, for example.

One approach for controlling the temperature of the CAC in order to reduce the amount of condensation entering the combustion chambers is disclosed in U.S. Patent Application Publication 2003/0056772 by Borrmann et al. In Borrmann, a charge air cooling circuit having a water-cooled CAC, heat exchanger and a coolant pump is provided to cool a temperature of charge air delivered to an internal combustion engine. To modulate the temperature of the charge air, an electrical water pump is provided and is responsive to a regulating unit in communication with a temperature sensor disposed adjacent to the CAC. When the temperature sensor measures a temperature of the coolant, it relays signals to the regulating unit to turn on or off the electrical coolant pump.

The inventors herein have recognized various issues with the above system. In particular, the aforementioned charge air cooling circuit having a water-cooled CAC requires the charge air cooling circuit to be driven by an electric or engine-driven coolant pump. However, this configuration requires additional circuits and energy to drive the coolant pump. Thus, there is added complexity, energy consumption and packaging burdens of said system. As a result, there may be a rise in the cost of manufacturing and overall reduction in fuel economy.

As one example, the issues described above may be addressed by a method for adjusting a coolant flow through a charge air cooler with a single coolant pump based on turbocharger speed, the single coolant pump mechanically driven by rotative power from a turbocharger. In this way, operation of the single coolant pump is powered by rotative power from the turbocharger and operation of the single coolant pump is controlled by turbocharger speed, thereby reducing engine power consumption and control complexity of the engine.

For example, the coolant pump may be mechanically coupled to and thus driven by a rotating shaft of the turbocharger coupling a turbocharger compressor to a turbocharger turbine. As such, the coolant pump is powered by turbocharger speed and a speed of the coolant pump increases with increasing speed of the rotating shaft. The coolant pump may be disposed in a charge air cooling circuit including the charge air cooler (CAC), a low-temperature radiator, and a thermostat valve. As turbocharger speed increases, coolant flow through the CAC increases. Further, as turbocharger speed increases, charge air flow from the compressor and to the CAC also increases. In this way, the CAC may provide the required cooling to the increased charge air flow as turbocharger speed increases. As such, there is a positive, linear relationship between the rotational speeds of the rotating shaft of the turbocharger to which the coolant pump is mechanically coupled and the amount of heated charge air produced by the compressor. Moreover, the system of direct coupling of the coolant pump to the rotating shaft of the turbocharger eliminates the need for additional electrical system (e.g., electrical, battery or engine-driven component) to drive the charge air cooling circuit. As a result, engine control complexity and power consumption may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods and a system for powering a coolant pump to drive a coolant using exhaust gas-driven rotations of a turbocharger. In one example, a coolant pump having an impeller is operably coupled to a rotating shaft extending axially from a compressor side of the turbocharger. As the rotating shaft spins in response to the flow of exhaust gases, the impeller may simultaneously spin, thereby powering the coolant pump to drive coolant into a circuit, such as a charge air cooling circuit, without an additional engine-driven or electrical coolant pump or power source. Thus, charge air cooling may be provided by a CAC in an engine system, such as the engine system shown in FIG. 1. The CAC may be a water-to-air CAC which cools the charge air with internally circulating coolant pumped by a single coolant pump. FIG.

Figure 3:
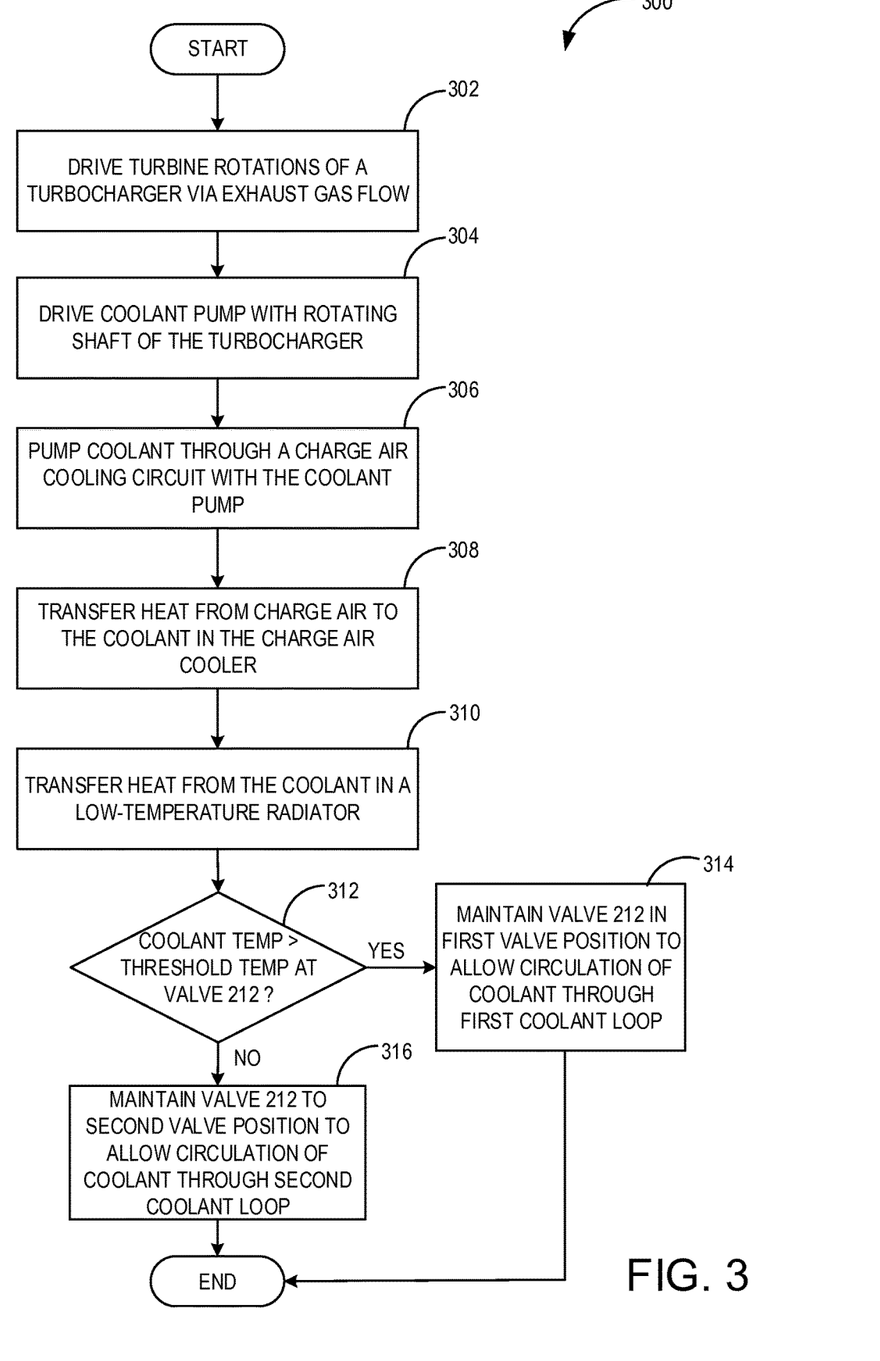
FIG. 3 is a flow chart showing an example method for providing power to a coolant pump.
Figure 4:
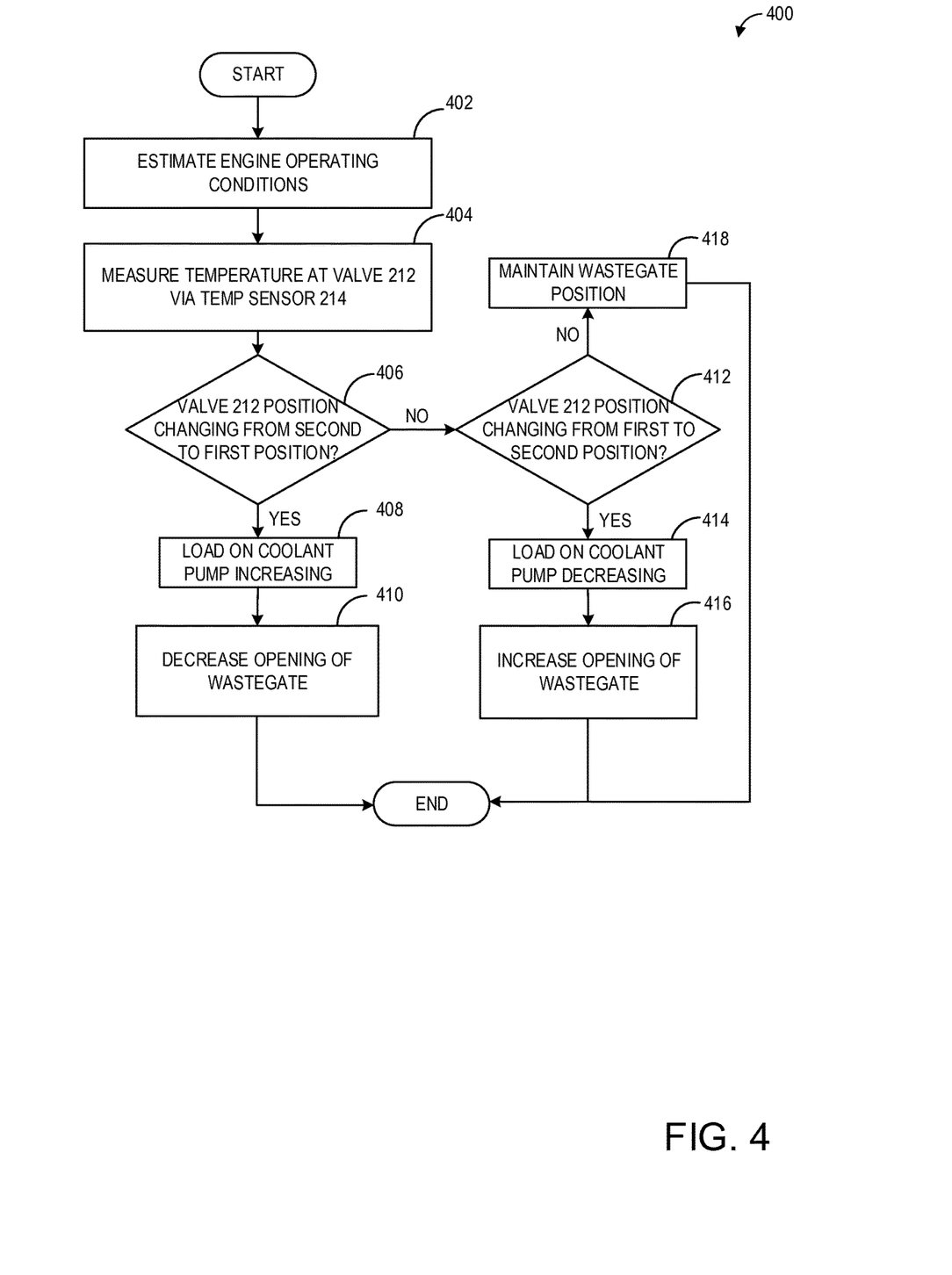
FIG. 4 is a flow chart showing an example method for adjusting a wastegate based on a coolant load of a coolant pump.

2 illustrates another example of an embodiment of the system, comprising the charge air cooling circuit with a coolant pump coupled to the rotating shaft of the turbocharger, such that the coolant pump having an impeller spins at substantially the same RPM as the turbine. FIG. 3 shows an example method for driving a flow of coolant using the systems of FIGS. 1 and 2. FIG. 4 shows an example method for controlling an amount of power to drive the coolant pump based on adjustments to a wastegate valve disposed in a bypass passage around the turbine of the turbocharger.

Figure 1:
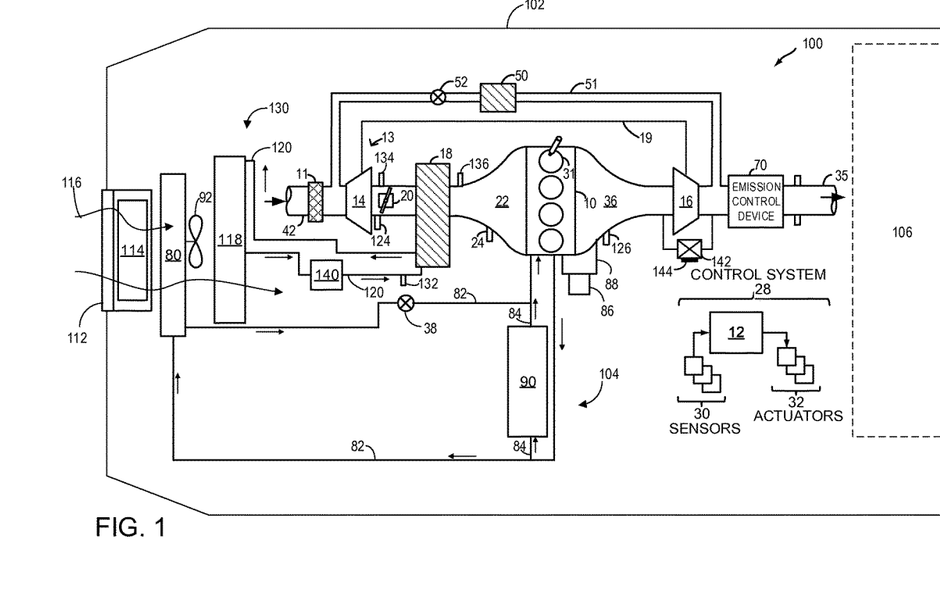
FIG. 1 is a schematic diagram of an example engine including a charge air cooler, coolant pump, and turbocharger.

FIG. 1 shows an example embodiment of an engine system 100, in a motor vehicle, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor 14 is shown as a turbocharger compressor mechanically coupled to turbine 16 via a rotating shaft 19, the turbine 16 driven by expanding engine exhaust. As such, the speed of the compressor 14 may be based on the speed of the turbine 16. As the speed of the turbine 16 increases, so too does the speed of the compressor so that more boost may be provided through to the intake manifold 22. In the embodiment shown in FIG. 1, the pressure of the charge air within the intake manifold is sensed by manifold air pressure (MAP) sensor 124. Since flow through the compressor can heat the compressed air, a downstream CAC 18 is provided so that boosted intake charge air can be cooled prior to delivery to the engine intake.

Figure 2:
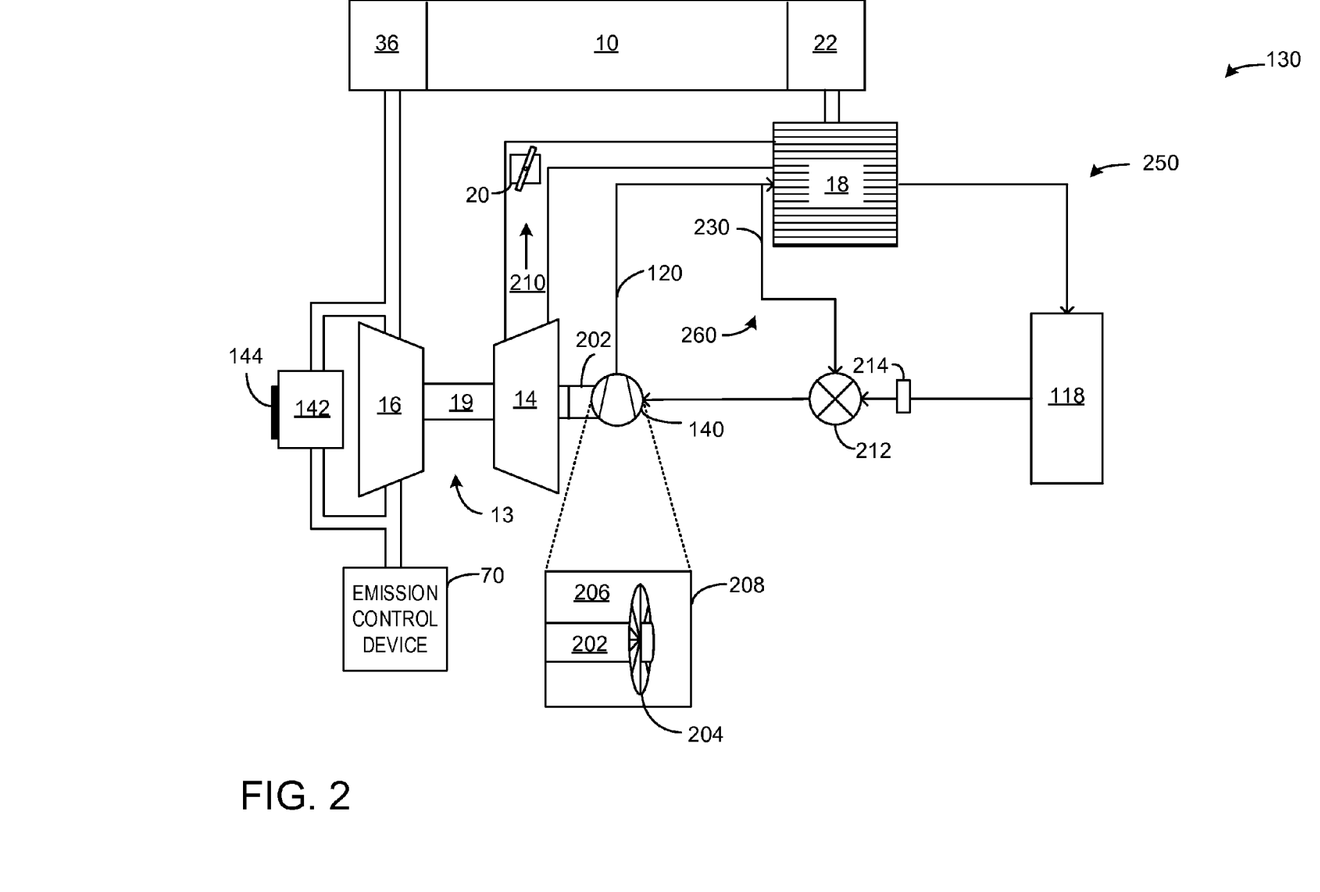
FIG. 2 is an expanded schematic diagram of an example charge air cooling circuit coupled to a turbocharger.

In one embodiment, a charge air cooling circuit 130 is provided including a coolant pump 140 having an impeller and pump housing, as shown in FIG. 2 (described further below). The coolant pump 140 is mechanically coupled to the rotating shaft 19 of the turbocharger 13, as shown in FIG. 2. In one example, the impeller of coolant pump 140 is mounted at a location of the rotating shaft 19 between one or more antifriction bearings of the turbine 16 and one or more antifriction bearings of the compressor (both not shown). In another embodiment, a downstream end of the rotating shaft proximal to the compressor 14, on the opposite side of the compressor 14 from the turbine 16, is extended in an axial direction by one or more appropriate mechanisms, such as casting or welding (shown in FIG. 2, described further below). The length and width of the extended portion is contingent on compatibility with a size and shape of the impeller and other coolant pump components. The impeller is mounted at a location on the extended portion of the rotating shaft, and may be disposed between one or more antifriction bearings of compressor 14 and one or more antifriction bearings installed at the downstream end of the extended portion (both not shown). In this way, rotating shaft 19 of turbocharger 13 serves as a drive wheel, and may securely and effectively provide rotative power to drive the impeller of coolant pump 140. The turbine-driven coolant pump may therefore provide high-pressure hydraulic flow of the coolant through the charge air cooling circuit 130 during high engine speeds. Further, in one embodiment, the turbine-drive coolant pump may be driven by rotative power from the turbocharger alone and not by any additional engine-driven or electrical power source. Further still, the coolant pump 140 is driven by turbocharger speed and not by additional engine operating conditions.

In another embodiment, the coolant pump may be integrated into the bearing housing of the turbocharger 13 and/or integrated on the same rotating shaft 19 as turbine 16 and compressor 14. Thus, the rotating shaft 19 may include one or more impellers and/or vanes that may propel coolant through a cavity to enable the coolant pump to function in the turbocharger turbine housing.

In one example, a higher flow of exhaust gases into the turbocharger may demand more cooling of charge air from the compressor. Since higher flow of air leads to simultaneous increased RPM of the turbine and the coolant pump, it is possible to meet the need for more cooling of the charge air by the turbine-driven coolant pump. Said another way, as engine speeds increases and provides increased mass air flow to the engine, increased charge air cooling via the CAC may be required. Additionally, as engine speed increases the turbine-driven coolant pump speed increases, thereby providing increased coolant flow to the CAC and thus increased cooling to the charge air flowing through the CAC. In this way, as engine speed increases, CAC cooling also increases. In another example, a lower flow of air into the turbocharger results in less demand for cooling of charge air from the compressor. Thus, slower spinning of the turbine will result in reduced power to the turbine-driven coolant pump. In this way, efficient, effective and controlled cooling of charge air is achieved via coupling of the coolant pump to the turbocharger's rotating shaft.

Coolant pump 140 may further include a pump housing, wherein an opening is provided wherethrough the rotating shaft 19 of turbocharger 13 may traverse and operably couple to the impeller. In addition, coolant pump 140 may comprise an axial mechanical seal (not shown). Further, no additional engine control is required to adjust coolant pump operation in response to changing mass air flow, engine speed, and CAC cooling needs.

In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

In addition, a wastegate 142 may be provided as a part of turbocharger 13 to divert exhaust gas flow around turbine 16 to control an amount of boost provided to an intake manifold 22 of the engine. Specifically, the wastegate 142 is disposed in a bypass passage around the turbine 16 (e.g., the bypass passage inlet couples to the exhaust passage upstream of the turbine 16 and the bypass passage outlet couples to the exhaust passage downstream of the turbine 16).

For example, opening the wastegate may reduce boost pressure. A wastegate valve may be controlled based on operating conditions to achieve the desired boost. In some embodiments, wastegate 142 is adjusted based on one or more coolant temperatures measured by one or more temperature sensors, e.g. sensors 134, 136, and 214, in the charge air cooling circuit 130, as described in FIGS. 2-4. In some embodiments, power required to drive the coupled coolant pump may cause the wastegate valve to be in a more closed position than a traditional turbocharger. This will enable a smaller wastegate mechanism, reducing cost and complexity of the system.

In some embodiments, wastegate 142 may be a multi-staged wastegate, such as a two-staged wastegate with a first stage configured to control boost pressure and a second stage configured to increase heat flux to emission control device 70. Wastegate 142 may be operated via an actuator 144, which, for example, may be an electric or a pneumatic actuator. Wastegate 142 may be controlled by controller 12 via actuators (e.g., actuator 144) to be opened when a lower boost pressure is desired or when fewer exhaust-driven rotations of the rotating shaft are preferred, for example. In one example, the wastegate may be adjusted to increase or decrease a pump speed of the coolant pump 140 in response to a coolant load on the coolant pump (as described further below with reference to FIG. 4).

In one example, actuator 144 is a solenoid valve, though various suitable devices may be used to drive the wastegate. Actuator 144 transmits a driving force via a linkage (e.g., a cylindrical rod) to a valve of wastegate 142, which may transition between a fully closed position and a fully open position, and may settle at any position therebetween. The position of the valve may thus be continuously variable, and may be monitored via a position sensor (not shown) configured to send signals to an engine controller such as controller 12. Thus, the amount of boost supplied to an engine may be controlled by driving wastegate valve via actuator 144, thereby altering the position of wastegate valve and the amount of gas reaching an intake manifold and turbine 16. Specifically, in one example, controller 12 may be configured to open and close wastegate 142 based on engine operating conditions (e.g., engine speed and/or engine load) and/or one or more coolant temperatures in the charge air cooling circuit.

As shown in FIG. 1, compressor 14 is coupled, through throttle valve 20, to CAC 18. In an alternate embodiment, the throttle valve 20 may be coupled to the engine intake manifold 22, downstream of the CAC 18. In yet another example, CAC 18 may also be a variable volume CAC. Hot charge air (boosted air) from the compressor enters the inlet of the CAC 18, cools as it travels through the internal cooling tubes of CAC, and then exits into engine intake manifold 22. Ambient air flow from outside the vehicle may enter engine 10 through a vehicle front end and pass across the CAC 18, to aid in cooling the charge air.

In the embodiment shown in FIG. 1, the CAC 18 is a water-to-air exchanger. As such, CAC 18 comprises a series of internal cooling tubes which water or another suitable coolant may flow through to cool the charge air passing over the outside of the cooling tubes. The cooling tubes of CAC 18 may be connected to the charge air cooling circuit 130. The CAC 18 includes a coolant inlet configured to receive coolant and a coolant outlet configured to expel coolant (not shown).

The charge air cooling circuit 130 also includes a low-temperature radiator 118 and cooling tubing 120. In an embodiment, as shown in FIG. 2, a coolant pump 140 included in cooling circuit 130 is operably and mechanically coupled to rotating shaft 19. In this example, coolant pump 140 is positioned upstream of the low-temperature radiator 118. However, other arrangements have been contemplated. For example, the low-temperature radiator 118 may be positioned downstream of coolant pump 140.

The low-temperature radiator 118 is configured to remove heat from the warmed coolant flowing from the CAC 18. In this way, heat may be drawn away from the charge air to the coolant in CAC 18 and from the coolant to ambient air in low-temperature radiator 118. This enables the temperature of the charge air delivered to the cylinders 31 to be reduced, thereby increasing both air charge density and therefore engine power. As such coolant pump 140 may pump cooled coolant from the low-temperature radiator 118, through the coolant tubing 120, and to the CAC 18.

Engine system 100 may further include a CAC inlet temperature sensor 134 and a CAC outlet temperature sensor 136. The CAC inlet temperature sensor 134 may sense the temperature of the charge air entering the CAC while the CAC outlet temperature sensor 136 may sense the temperature of the charge air exiting the CAC. As such, the CAC outlet temperature sensor 136 may give a reading of the CAC outlet temperature, or manifold charge air temperature. The controller 12 may use data from these sensors to control various cooling elements of the engine system, including an engine cooling fan 92, the coolant pump 140, wastegate 142, and an opening of grille shutters 114. In some embodiments, a second fan may be included in engine system 100, coupled directly to the low-temperature radiator 118. The charge air cooling circuit 130 may also include a temperature sensor 132 for measuring the coolant temperature at the CAC coolant inlet. In other embodiments, as shown in FIG. 2, one or more temperature sensors 214 may be disposed in cooling circuit 130, such as at a location downstream of the low-temperature radiator 118 and upstream of the coolant pump 140.

CAC cooling may be further adjusted with external cooling elements. Specifically, ambient air flow 116 from outside the vehicle may enter engine 10 through a grille 112 at a vehicle front end and pass across the low-temperature radiator 118, to aid in cooling the coolant passing through the CAC 18. Thus, increasing ambient air flow 116 across the low-temperature radiator 118 may further affect the coolant's temperature, thereby altering the efficiency and cooling capacity of the CAC 18. For example, increasing ambient air flow 116 across the low-temperature radiator 118 may increase the low-temperature radiator cooling efficiency, thereby decreasing the coolant temperature. The controller may adjust a position of grille shutters 114 to uncover or cover the grille 112, thereby increasing or decreasing ambient air flow 116 into the engine, respectively. Such ambient air flow 116 may then be utilized by radiator 80, engine cooling fan 92, and low-temperature radiator 118 to keep the coolant, engine and/or transmission cool. The engine cooling fan 92 may be adjusted to further increase or decrease the air flow to the engine components.

In alternative examples, a compressor by-pass valve (not shown) may be coupled in series between the inlet and the outlet of compressor 14. The compressor by-pass valve may be a normally closed valve configured to open under selected operating conditions to relieve excess boost pressure and provide increased mass flow through the compressor by recirculating air in the induction system. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive rotations of the turbine. When reduced turbine torque is desired, some exhaust may be directed instead through the aforementioned wastegate 142, bypassing turbine 16. The combined flow from the turbine and the wastegate then flows through emission control device 70. In general, one or more emission control devices 70 may include one or more exhaust aftertreatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16 or upstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR or high pressure (HP) EGR if taken off upstream of the turbine. The rotation of the compressor, in addition to the relatively long EGR flow path in engine system 100, provides homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the coolant line 82, which may be kept closed until the coolant reaches a threshold temperature.

Engine system 100 may include an engine cooling fan 92 for directing cooling airflow toward the CAC 18, engine cooling system 104, or other engine system components. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, engine cooling fan 92 may be coupled to the engine accessory drive system, driven by the engine crankshaft. In other embodiments, engine cooling fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Engine coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as coolant temperature, transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), coolant pump speed, and others. The controller may also send a plurality of control signals to various engine actuators 32 in order to adjust engine operation based on signals received from the sensors 30. For example, actuators 32 may include actuator 144 for adjusting a position of wastegate 142 and various other actuators for adjusting a position of throttle valve 20, adjusting operation of engine cooling fan 92, and the like.

FIG. 2 shows another example embodiment of a portion of the engine system of FIG. 1, including the turbocharger 13 and the charge air cooling circuit 130 including coolant pump 140, CAC 18, low-temperature radiator 118, a thermostat valve 212, and at least one temperature sensor 214 disposed at or adjacent to the thermostat valve 214 for measuring one or more temperatures of coolant passing therethrough. For example, the temperature sensor 214 may be included as part of the thermostat valve 214.

In one embodiment, coolant pump 140 includes an impeller 204, wherein the impeller 204 is operably coupled to an extended portion 202 of rotating shaft 19 extending axially from compressor 14, opposite in direction of turbine 16. Said another way, the extended portion 202 of the rotating shaft 19 extends outwardly from the compressor 14 and away from the turbine 16 in an axial direction. In this example, one or more additional bearings may be installed at the distal end of extended portion 202 of the rotating shaft at a distance away from compressor 206, wherein the impeller 204 is disposed therebetween. The additional bearings reduce frictional stress between the pump and shaft, as well as provide support and security for the coolant pump 140.

In another example, the impeller 204 may be operably coupled on the rotating shaft 19 between a first set of bearings of turbine 16 and a second set of bearings of compressor 14, such that coolant pump 140 is generally located near the center of the rotating shaft 19, between the compressor 14 and turbine 16. The bearing housing of the turbine may comprise a passage suitable to enable rotating vanes to pump the coolant. In yet another example, no impeller is installed. Instead, a plurality of gears (not shown) may be configured to transfer the power of the rotating shaft to an external coolant pump. In one embodiment, interlocking and complementary teeth of one or more pairs of gears on the rotating shaft 19 and on the coolant pump 140 are configured to rotate together in opposite directions as the turbine 16 rotates from exhaust gas flow. In this way, one or more pairs of gears may provide force to drive the coolant through the charge air cooling circuit 130. In an alternative embodiment, a plurality of drive mechanisms including chains, belts, and gear driven shafts may be configured to provide force to drive the coolant through the charge air cooling circuit 130.

In another embodiment, impeller 204 of coolant pump 140 is substantially enveloped by a pump housing 208. The pump housing 208 forms a pumping chamber 206 at a distance around the outer circumference of the impeller 204. The coolant pump 140 may also include a storage chamber (not shown) for coolant not confined in the pumping chamber 206, and a conduit (not shown) linking the pumping chamber 206 and the storage chamber. A plurality of vanes on an outer circumference of the impeller 204 push the coolant out from the pump housing 208 into the charge air cooling circuit 130 as shaft 19 rotates, producing centrifugal forces and a plurality of vortices within the pumping chamber.

As discussed above, as turbine 16 rotates, the coolant pump 140 coupled to the turbine's rotating shaft 19 via impeller 204 is powered to drive the flow of coolant in the charge air cooling circuit 130. Cooling circuit 130 contains a plurality of coolant tubing 120, wherein the coolant travels from the coolant pump 140 into to a first coolant loop 250 and/or a second coolant loop 260.

The first coolant loop 250 comprises sequential movement of coolant from the coolant pump 140 to CAC 18 and then to low-temperature radiator 118. The coolant may or may not then be routed through a thermostat valve 212 back to the coolant pump 140. Specifically, in CAC 18, heat is transferred from charge air 210 to the coolant, such as water or another appropriate solution. The coolant then travels downstream to the low-temperature radiator 118, wherein heat in the coolant is transferred from the coolant to ambient air. In one example, the low-temperature radiator 118 may additionally have ambient air directed toward it by a fan (not shown) to obtain an increased heat transfer rate.

The coolant may proceed to thermostat valve 212, if provided, whereby the thermostat valve 212 may be opened to allow coolant to flow through if a threshold coolant temperature is met. Herein, the open position of thermostat valve 212 to allow coolant flow through the first coolant loop 250 refers to a first valve position. If the coolant temperature is at or above the threshold coolant temperature, then coolant may return back to coolant pump 140. Of note, if thermostat valve 212 is in the first valve position, then thermostat valve 212 may be configured to be closed to other coolant lines feeding into thermostat valve 212, such as a bypass line 230, described below.

Moreover, because the first coolant loop 250 comprises multiple components, namely CAC 18 including a plurality of internal cooling tubes and the low-temperature radiator 118, the coolant flowing therethrough experiences higher levels of resistance. Therefore, as the coolant returns to coolant pump 140 in the first coolant loop 250, coolant pump 140 experiences greater back-pressure due to the higher coolant flow resistance. As a result, there is a higher coolant load on the coolant pump when coolant travels through the first coolant loop 250 compared to coolant traveling through the second coolant loop 260 having fewer resistive components. In this way, higher coolant load may demand more rotative power to drive the coolant pump, and, thus, greater turbine torque may be desired.

The cooling of charge air 210 in the first coolant loop 250 allows for the cooled, high density charge air to be routed to the intake manifold 22 of the engine 10 so that combustion efficiency is effectively increased. The increased flow of the coolant in the cooling circuit 130 due to increased turbine speeds allows a higher influx of charge air 210 to be cooled more rapidly and efficiently.

Like the first coolant loop 250, the second coolant loop 260 may include sequential movement of coolant from coolant pump 140. However, instead of entering the inlet of CAC 18, the coolant enters the bypass line 230 that bypasses CAC 18 and low-temperature radiator 118. The bypass line 230 feeds coolant to the thermostat valve 212, whereby the thermostat valve 212 may be configured to allow coolant to flow through the bypass line 230 and to the coolant pump 140 if the coolant temperature is below the threshold coolant temperature. Herein, the open position of thermostat valve 212 to allow coolant flow through the second coolant loop 260 refers to a second valve position. If thermostat valve 212 is in the second valve position, then thermostat valve 212 is configured to be closed to other coolant lines feeding into thermostat valve 212, such as coolant tubing 120 coupled from the low-temperature radiator 118 to thermostat valve 212 in the first coolant loop 250. Therefore, if the coolant temperature is below the threshold coolant temperature, then the coolant from bypass line 230 flows back to coolant pump 140.

Furthermore, because the second coolant loop 260 comprises fewer components compared to the first coolant loop 250 (i.e. the coolant does not travel through a CAC or low-temperature radiator), then the coolant flowing therethrough experiences lower flow resistance. As the coolant returns to coolant pump 140 in the second coolant loop 260, there is less back-pressure and resistance on coolant pump 140, thereby resulting in lower coolant load on the coolant pump than compared to when the thermostat valve 212 is in the first position and coolant flows through the first coolant loop 250. Low coolant load may demand less rotative power to drive the coolant pump, and, thus, less turbine torque may be desired.

In other words, flowing coolant through the first coolant loop 250 may result in increased coolant load on the coolant pump 140 compared to when the coolant flows through the second coolant loop 260. Therefore, when the coolant temperature is greater than the threshold coolant temperature, then the thermostat valve 212 may be in the first valve position. In this particular example, the coolant pump 140 may require additional power from the turbine to drive the coolant pump 140 to deliver the necessary coolant flow to the CAC 18. On the other hand, when the coolant temperature is less than the threshold coolant temperature, the thermostat valve 212 is in the second valve position and the coolant pump 140 may require less power from the turbine to deliver the necessary coolant flow to the CAC 18. In particular, transitioning between the first position and the second position of thermostat valve 212 (and thus transitioning between flowing coolant through the first coolant loop 250 and the second coolant loop 260) may result in a change in coolant load on the coolant pump. During this transition, there may be a lag in the pumping power output by the coolant pump 140 due to the changing coolant load, thereby resulting in a change in the coolant flow. Thus, in one example, the controller may adjust the wastegate to adjust turbocharger speed in order to provide more or less rotative power to the coolant pump 140 and compensate for the changing coolant load, as described further below with reference to FIG. 4.

In one embodiment, at least one temperature sensor 214 is also provided at a location upstream and adjacent to or downstream and adjacent to thermostat valve 212. In other examples, temperature sensor 214 may be disposed upstream and adjacent to the coolant pump 140. Temperature sensor 214 may be a thermocouple, thermistor or any other temperature sensing device. In yet another embodiment, the temperature sensor 214 may be integrated within the thermostat valve 212. As such, the thermostat valve 212 may adjust automatically, without input from the controller, based on the measured coolant temperature relative to a temperature set-point (e.g., the threshold coolant temperature) of the thermostat valve 212. In one embodiment, temperature sensor 214 measures a temperature of the coolant from low-temperature radiator 118. Alternatively, sensor 214 may measure a temperature of the coolant in bypass line 230. Temperature sensor 214 is configured to send temperature measurements to be stored and retrieved by controller 12 (shown in FIG. 1). Therefore, controller 12 may use data from temperature sensor 214 to control various elements of the engine system, such as the opening and closing of the wastegate 142 (shown in FIG. 1). Adjustments to the wastegate 142 based on one or more temperature measurements from temperature sensor 214 may compensate for lags in coolant pump efficiency when the temperature valve 214 transitions from the second position to the first position, or vice versa.

In alternative embodiments, a temperature sensor is not provided. Instead, one or more pressure and/or flow sensors may be disposed at a location downstream and adjacent to the thermostat valve 212, in order to sense a flow of coolant. Like temperature sensor 214, these additional and/or alternative sensors may be in communication with controller 12, such that measurements from the pressure and/or flow sensors may provide predictive information to adjust one or more engine parameters, such as an opening or closing of a wastegate 142 (shown in FIG. 1).

In this way, the system shown in FIG. 2 allow for coolant flow through a CAC cooling circuit 130 to be driven by the turbine-driven coolant pump 140. For example, the turbine-driven coolant pump 140 may be driven by rotative power of the turbocharger rotating shaft 19. In one example, the coolant pump 140 may be driven directly by the rotating shaft 19 positioned between the compressor 14 and the turbine 16. In another example, the coolant pump 140 may be driven by an extended portion 202 of the rotating shaft 19 extending axially outwardly from the compressor and away from the turbine. Thus, an impeller 204 or alternate mechanical component of the coolant pump 140 (such as one or more pairs of complementary gears) may be directly coupled to either the rotating shaft 19 or the extended portion 202 of the rotating shaft 19 in order to translate rotative power from the rotating shaft 19 and to the coolant pump 140. As such, a speed of the coolant pump is directly related to a speed of the rotating shaft 19 of the turbocharger and thus directly related to a speed of the engine (e.g., RPM). Thus, as described further below, as engine speed increases, coolant pump speed increases (without actuation by the controller), thereby providing increased cooling to charge air flowing through the CAC 18.

Turning now to FIG. 3, an example method for driving coolant in a charge air cooling circuit, such as the charge air cooling circuit shown in FIGS. 1-2, is disclosed. In one example, the method of FIG. 3 may be performed automatically, without intervention of an engine controller (such as controller 12 shown in FIG. 1) by the components of the system presented in FIGS. 1-2. Thus, the method of FIG. 3 may be described below with continued reference to FIG. 2. At the beginning of routine 300, the thermostat valve 212 may be in the first position and thus coolant may flow through the first coolant loop 250, as described above.

Routine 300 begins at 302, by driving rotation of a turbine (e.g., turbine 16 of FIGS. 1-2) with exhaust gases flowing from the exhaust manifold (e.g., exhaust manifold 36 shown in FIGS. 1-2) and through the turbine. In an example, during a first condition, wherein engine speed and/or load are at higher level, a larger amount of exhaust gas enters the turbocharger turbine than when the engine speed and/or load are at a lower level, thereby producing increased turbine torque and energy to drive the compressor 14 and coolant pump 140. As a result, at 304, the coolant pump 140 is driven by rotation of the rotating shaft 19 of the turbocharger. As described above with reference to FIG. 2, a mechanical component of the coolant pump (such as impeller 204) is mechanically coupled to the rotating shaft 19 of the turbocharger. As such, rotation of the rotating shaft 19 is translated to the mechanical component of the coolant pump, thereby driving rotation of the coolant pump. For example, impeller 204 operably coupled to rotating shaft 19 may produce a substantial amount of force to circulate coolant in the charge air cooling circuit 130.

At 306, the routine includes pumping coolant through the charge air cooling circuit 130 with the coolant pump 140. As described above, the coolant pump speed is controlled by rotation of the rotating shaft 19 and thus increases with increasing engine speed. Coolant pumped by coolant pump 140 in the charge air cooling circuit 130 travels downstream from the coolant pump 140 to CAC 18. Coolant flowing through the internal cooling tubes of CAC 18 may transfer heat away from the charge air flowing over the CAC and into the coolant. In this way, the routine at 308 includes transferring heat from charge air to the CAC coolant in the CAC 18. As such, the coolant may absorb heat from the charge air generated from compressor 14. After the charge air (e.g., charge air 210 shown in FIG. 2) is sufficiently cooled by the coolant, the charge air is directed to the intake manifold 22. Thus, the temperature of the charge air delivered to cylinders 31 is reduced at the CAC, thereby increasing engine power.

In another example, during a second condition, such as reduced engine speed and/or load, less exhaust gas may enter the turbocharger. Therefore, there is reduced turbine torque, leading to both reduced charge air generation and power to drive the coolant pump. Thus, less coolant travels to the CAC 18.

In this way, there is a direct, proportional relationship between the amount of charge air derived from the compressor and the amount of cooling of said charge air by the CAC. Consequently, desired cooling of a given amount of charge air may be met with the turbocharger-driven coolant pump 140 and not by an electric or additional engine-driven coolant pump.

Proceeding from 308, at 310, the routine includes transferring heat from the coolant in a low-temperature radiator (e.g., low-temperature radiator 118 shown in FIGS. 1-2) in the charge air cooling circuit 130. For example, hotter coolant from the CAC 18 may travel downstream in the charge air cooling circuit 130 to be received by the low-temperature radiator 118. In one example, heat from the coolant is transferred to ambient air flowing through the low-temperature radiator 118 as the heat-transfer fluid. The low-temperature radiator 118 may be fluidly coupled back to coolant pump 140 of the cooling circuit via thermostat valve 212.

As discussed above in reference to FIG. 2, the thermostat valve 212 serves to control a flow of coolant back to the coolant pump 140 in the first coolant loop 250 or the second coolant loop 260. In one embodiment, thermostat valve 212 may be configured to allow coolant to flow through the first coolant loop 250 if a threshold coolant temperature is met (e.g., a set-point temperature of the thermostat valve 212). At 312, if the coolant temperature is confirmed to be greater that the threshold coolant temperature at thermostat valve 212, the valve may remain in the first position at 314 to allow coolant flow for the first coolant loop 250 (referred to as the first valve position). In this way, when the coolant temperature is at or above the temperature threshold, then coolant in the first coolant loop 250 may return back to coolant pump 140 to be pumped again downstream to CAC 18 and low-temperature radiator 118.

In another embodiment, if the coolant temperature is confirmed to be less than the threshold coolant temperature at thermostat valve 212 at 312, then the thermostat valve 212 is adjusted into the second position at 316 to allow coolant to flow through the second coolant loop 260 (referred to as the second valve position). Therefore, if the coolant temperature is below the threshold coolant temperature, then the coolant from bypass line 230 via the second coolant loop 260 may flow back to coolant pump 140.

It will be appreciated that when thermostat valve 212 is in the first valve position, coolant may flow through the first coolant loop 250 but not through the bypass line 230 of the second coolant loop 260. When thermostat valve 212 is in the second valve position, coolant may flow through the second coolant loop 260 but not through the CAC 18 and low-temperature radiator 118 of the first coolant loop 250. In this way, coolant flow may be controlled in various conditions demanding different amounts of coolant cooling.

In some embodiments, one or more temperature sensors, e.g. temperature sensor 214, are disposed at or adjacent to the thermostat valve 212 in order to determine a temperature of the coolant flowing therethrough. One or more temperature sensors may provide measurements to controller 12, which may in turn use the temperature data to predict a coolant load on the coolant pump and control adjustments to a wastegate, as described below in FIG. 4. In other embodiments, CAC inlet temperature sensor 134 and CAC outlet temperature sensor 136 may be used instead or in addition to temperature sensor 214 in routine 300 and/or for adjusting the wastegate.

In sum, routine 300 allows for more consistent and proportional regulation of coolant flow based on a rotational speed of the turbocharger turbine and thus the amount of hot charge air produced. The almost linear relationship between engine speed (and thus turbocharger speed) and charge air flow to the engine allows for control of charge air temperature. For example, as the turbocharger speed increases, charge air flow to the engine increases requiring increased cooling. However, coolant pump speed also increases with the increasing engine speed, thereby providing adequate charge air cooling. Further, the coolant flow may be provided by a coolant pump driven by the turbocharger alone and not by any additional electric or engine-driven pumps, thereby reducing power consumption of the engine. Further still, by adjusting coolant flow through the charge air cooling circuit automatically with torque provided by the turbocharger, the complexity of engine control is reduced. Said another way, driving the coolant pump with rotation of the turbocharger instead of a controller-adjusted actuator, engine control complexity is reduced while providing adequate charge air cooling based on engine speed.

Referring now to FIG. 4, an example method for adjusting a wastegate (such as wastegate 142 shown in FIG. 1) disposed in a bypass passage around a turbine of the turbocharger in response to one or more of the coolant temperature transitioning above or below the threshold temperature and the thermostat valve changing positions between the first and second positions, as described above. Regulation of opening and closing of the wastegate allows for control of power (e.g., rotative power) provided to the coolant pump since the wastegate controls the flow of exhaust gas through the turbine. Said another way, the position (or amount of opening) of the wastegate may adjust the amount of exhaust gas flowing from the engine and to the turbine, thereby changing the rotational speed and shaft power put generated by the turbine and put through the turbocharger shaft (e.g., rotating shaft 19 shown in FIGS. 1-2). Thus, adjustments to the wastegate may increase or decrease turbine torque, spinning of rotating shaft 19, and consequently the driving force supplied to the coolant pump 140.

In one example, the position of the wastegate may be at least partially based on a coolant load on the coolant pump 140. The coolant load on the coolant pump 140 may change based on whether the thermostat valve 212 is in the first position (i.e., open to allow coolant flow through the first coolant loop 250) or the second position (i.e., open to allow coolant flow through the second coolant loop 260). For example, when the thermostat valve 212 is in the first position, the valve 212 is open to the low-temperature radiator 118 and closed to the bypass line 230. As a result, the coolant load on the coolant pump may be higher than when the thermostat valve 212 is opened to bypass line 230 and closed to the low-temperatures radiator 118.

When the coolant pump load becomes higher due to the thermostat valve 212 transitioning from the second valve position to the first valve position, an increase in rotative power may be required in order to drive the coolant pump and provide a required coolant pump speed. When the thermostat valve 212 transitions between the two positions described above, a lag in the required turbocharger rotative power to drive the coolant pump may result until the turbocharger and/or coolant pump may compensate for the change. Thus, changes (or anticipated changes) in a position of the thermostat valve 212 may be used to predict changes in the coolant pump load and thus determine a desired adjustment to the turbocharger speed. As one example, a controller (such as the controller 12 shown in FIG. 1) may adjust a position of the wastegate in order to adjust the rotational speed of the turbocharger shaft and thus the rotative power supplied to the coolant pump.

One method to assess whether the thermostat valve 212 upstream of the coolant pump is changing position (or is going to change position) is by measuring at least one temperature of the coolant at the thermostat valve 212 by one or more temperature sensors, such as temperature sensor 214. As discussed in FIGS. 2-3, thermostat valve 212 may transition to the first position, wherein coolant is permitted to flow through the first coolant loop 250, when the coolant temperature is at or above the threshold coolant temperature. Alternatively, thermostat valve 212 may move to the second position, wherein coolant is allowed to flow through the second coolant loop 260, when the coolant temperature is below the threshold coolant temperature. Therefore, measuring the coolant temperature at or adjacent to valve 212 using at least one temperature sensor 214 may predict when the thermostat valve 212 may change position. In this way, at least one temperature measured at the thermostat valve 214 may provide estimations of a coolant load on a coolant pump and thus the amount of turbine torque, adjustable by controller 12 via changes to a valve position on wastegate 142, needed to adequately circulate the predicted increase or decrease in coolant load on coolant pump 140.

In other words, if the thermostat valve 212 is open to the first coolant loop 250, there is an increase in coolant load on the coolant pump since the coolant may have increased resistance as a result of flow through the internal cooling tubes of CAC 18 and low-temperature radiator 118. For this reason, an increase in exhaust gas flow into the turbine is desirable for driving the rotating shaft 19 of the turbocharger 13 mechanically coupled to coolant pump 140.

In contrast, if the thermostat valve 214 is open to the second coolant loop 260, there may be lower coolant load on the coolant pump 140 and thus less rotational power is needed to be supplied to the coolant pump 140. In order to provide more or less power to the coolant pump, one possible method is through adjustments to the wastegate valve. The partial or complete opening or closing of the valve of wastegate 142 may impact the rotative power driving the coolant pump since the wastegate position regulates an amount of exhaust gases to the turbine. Herein, routine 400 may be initiated to control a wastegate responsive to one or more temperatures of coolant at thermostat valve 212. Alternatively or additionally, the position of the wastegate may be controlled responsive to a change in positon of the thermostat valve 212, as determined from a valve position sensor and/or commands from a controller. Furthermore, routine 400 may be carried out by a controller of a vehicle, such as controller 12, which may retrieve data from one or more sensors (such as temperature and position sensors) and deliver commands to the wastegate 142.

Routine 400 begins at 402 by estimating and/or measuring engine operating conditions. Engine operating conditions may include engine speed and engine load, ambient temperature and humidity, mass air flow, coolant pump speed, grille shutter position, engine cooling fan speed, CAC fan speed, engine temperatures (e.g., engine coolant temperature and under-hood temperature), etc. In other embodiments, the conditions may be directly measured with sensors, such as sensors 24, 124, 126, 132, 134, 136, and 214, as shown in FIGS. 1-2. The assessed conditions may include coolant temperature, engine oil temperature, mass airflow (MAF), manifold pressure (MAP), boost (for example, BOOST pressure from sensor 123), throttle inlet pressure (TIP), engine speed, idle speed, barometric pressure, a driver-demanded torque (for example, from a pedal position sensor), air temperature, vehicle speed, etc.

At 404, one or more temperature readings are measured by temperature sensor 214 disposed upstream and/or downstream of thermostat valve 212. In other embodiments, additional and/or alternative sensors may be provided, as described in FIG. 3. For example, a flow sensor may be installed downstream of the thermostat valve to sense a flow of coolant upstream of the coolant pump. In another example, a rotational sensor may be disposed on impeller 204 and/or the rotating shaft 19 in order to measure an amount of torque exhibited by turbine 16 as a result of the flow of exhaust gases from the exhaust manifold. Further still, the method at 404 may include determining a positon of the thermostat valve 212 based on feedback from a position sensor of the thermostat valve 212.

After acquiring measurements from one or more sensors, at 406, it may be determined by controller 12 if thermostat valve 212 is changing from the second valve position to the first valve position. In other words, it is assessed if the thermostat valve 212 is transitioning from a position allowing coolant to flow in the second coolant loop 260 to a position allowing coolant to flow in the first coolant loop 250. This determination may be substantially based upon one or more measurements of the coolant temperature by one or more temperature sensors (measured at 404). As described above, thermostat valve 212 is in the first valve position when the coolant is at or above a pre-determined threshold coolant temperature while the valve 212 is in the second valve position when the coolant is below the same pre-determined threshold coolant temperature. In an alternative embodiment, the thermostat valve may be an electronic proportional flow control valve. As such, controller 12 may determine the valve position (e.g., the first, second, and/or one or more intermediate positions) responsive to one or more temperature and/or position signals sent by the electronic proportional flow control thermostat valve.

Specifically, in one example, it may be determined if the coolant is at the threshold coolant temperature at which a wax-actuated thermostat valve, such as thermostat valve 212, transitions from the second valve position to the first valve position. In this example, the threshold coolant temperature may be 80° C. Thus, if one or more coolant temperatures sensed by the temperature sensor 214 is measured to be at or approaching 80° C., the thermostat valve 214 may be transitioning from the second valve position to the first valve position. In another example, the threshold coolant temperature may be different than 80° C.

In another example, if one or more of the coolant temperatures measured by the temperature sensor 214 is within a narrow temperature range of the threshold coolant temperature, e.g., 5° C. outside of the threshold coolant temperature, and also increasing steadily, then the routine may predict that the thermostat valve 212 may be transitioning between the second and first valve position or vice versa. Said another way, controller 12 may determine if the coolant temperature is increasing to and beyond the threshold coolant temperature by measuring coolant temperatures by the temperature sensor 214 at thermostat valve 212.

If the coolant temperature is confirmed to be increasing by controller 12 at 406, then thermostat valve 214 may be transitioning from the second valve position to the first valve position. Since the first valve position of thermostat valve 212 allows flow through the first coolant loop 250, then the downstream coolant load on coolant pump 140 may increase following the valve position transition, as discussed above in FIGS. 2-3.

In another example, the method at 406 may include determining if the thermostat valve 212 is moving from the second positon to the first position based on feedback from a position sensor of the thermostat valve 212. Thus, if position sensor detects a changing or changed positon of the valve, the method may continue to 408.

Thus, at 408, it is indicated that coolant load on the coolant pump may be increasing. Higher coolant load on coolant pump 140 may require increased turbine torque to drive the more resistant coolant flow by the coolant pump and through the CAC. Therefore, routine 400, via controller 12, may deliver one or more signals to actuator 144 of wastegate 142 to decrease the opening of the wastegate at 410. In one example, the wastegate may be closed completely. In another example, the wastegate may be partially closed. Therefore, little to no exhaust gases derived from the exhaust manifold is diverted away from the turbocharger and thus may be then utilized to enhance exhaust gas flow to rotationally drive turbine 16, rotating shaft 19, and coolant pump 140.

On the other hand, if controller 12 does not confirm that thermostat valve 212 is changing from the second valve positive to the first valve position, then it may be confirmed at 412, instead, if the thermostat valve 212 is changing from the first to second valve position. Therefore, if one or more measurements from one or more of the coolant temperature sensors are less than or within a narrow temperature range below the threshold coolant temperature and/or steadily decreasing, it may be determined by controller 12 that thermostat valve 212 is transitioning from the first valve position to the second valve position. Alternatively, feedback from a thermostat valve position sensor may determine if the thermostat valve 212 is transitioning form the first valve position to the second valve position.

If it is confirmed that the thermostat valve 212 is changing positions from the first to the second positon, at 414, the coolant load on the coolant pump may be predicted to be decreasing due to the second coolant loop 260 having lower coolant flow resistance that the first coolant loop 250. Therefore, reduced turbine torque may be required to deliver the required coolant flow. At 416, controller 12 may thus increase the opening of a wastegate 142 via actuator 144 to be at or near an opened position. As a result, exhaust gases may be diverted away from the turbine to be treated in the emission control device 70.

If the thermostat valve 212 is not changing from the first valve position to the second valve position at 412, then at 418, the wastegate 142 is not adjusted and no signals to actuator 144 may be prompted.

In sum, measuring at least one temperature of the coolant at a location adjacent to or at the thermostat valve 212 may predict a coolant load on the coolant pump 140. In order to compensate for changes in coolant load, adjustments to a position of a wastegate valve of wastegate 142 may be used to allow appropriate amounts of exhaust flow to the turbine in order to reduce the aforementioned lag in the required turbocharger rotative power to drive the coolant pump. Thus, changes (or anticipated changes) in a position of the thermostat valve 212 may be used to predict changes in the coolant pump load and thus determine a desired adjustment to the turbocharger speed.

In addition, in other embodiments, the anticipated coolant load on coolant pump 140 may also take into account various engine operating conditions measured at 402 that may contribute to changes to the amount of exhaust gas entering the turbocharger and the amount of charge air generated by the compressor. For example, high engine speed and load may translate to higher rates of rotation of the turbine and therefore an increased amount of charge air being generated. Therefore the estimated load on the coolant pump may also be high and actuator 144 may be signaled to close wastegate 142. It will be appreciated measurements and estimations of engine operating conditions and/or one or more sensors, alone or in combination, may be used to estimate coolant load and thus actuation of the wastegate valve.

The technical effect of operably coupling a coolant pump to a turbocharger such that energy may be harnessed as the turbocharger's turbine rotates is the ability to control charge air temperature while lowering energy consumption of the downstream cooling circuit and therefore increasing fuel efficiency. By coupling an impeller of a coolant pump, or an alternate mechanical component of a coolant pump that is adapted to transfer rotative power, to the rotating shaft of a turbocharger, the coolant pump may adequately meet the demands of cooling of charge air. Specifically, because the expanded exhaust gases flowing through an engine exhaust passage to a turbocharger turbine power both the turbocharger compressor and coolant pump, demands for cooling by an increase in the amount of hot charge air may be met by a simultaneous increase in power driving the coolant pump in the charge air cooling loop. Furthermore, adjustments to a wastegate in response to changing coolant load of the coolant pump allows for predictive responses that gauges a required rotative speed of the turbocharger shaft to power the coolant pump to provide a required coolant flow for charge air cooling. In this way, it is possible to more quickly and effectively cool charge air without an additional electrical or engine-driven coolant pump having complicated control components.

Thus, in one example, the methods described herein provide for adjusting a coolant flow through a charge air cooler with a single coolant pump based on turbocharger speed. The single coolant pump is mechanically driven by rotative power from a turbocharger. The single coolant pump may be the only coolant pump drive by rotative power from the turbocharger, and in one example may be the only pump coupled to the turbocharger shaft as well as the only coolant pump pumping coolant in the entire engine coolant circuit. In one example, the method may include increasing the coolant flow to the charge air cooler as the turbocharger speed increases, as well as decreasing the coolant flow to the charge air cooler as the turbocharger speed decreases. In another example, the method may provide for increasing charge air flow from a compressor of the turbocharger upstream from the charge air cooler as turbocharger speed increases and decreasing charge air flow from the compressor as turbocharger speed decreases, wherein the compressor is positioned upstream from the charge air cooler.

In an embodiment, the method also comprises driving an impeller of the single coolant pump to pump coolant through a charge air cooling circuit to the charge air cooler with a rotating shaft of the turbocharger. In this example, the impeller may be operably coupled to the rotating shaft. Further still, in another embodiment, a thermostat valve, having a first position and a second position, is disposed downstream of the charge air cooling in the charge air cooling circuit and said valve may be adjusted based on a coolant temperature of coolant circulating through the charge air cooling circuit Specifically, in one example, the method may comprise adjusting the thermostat valve into the first position where coolant flows from an outlet of the charge air cooler, through a low-temperature radiator, to the single coolant pump, and then through the charge air cooler, when a coolant temperature is greater than a threshold coolant temperature. In another example, the method also includes adjusting the thermostat valve into the second position where coolant flow bypasses the charge air cooler and flows directly from an inlet of the charge air cooler and to the single coolant pump without flowing through the low-temperature radiator and the charge air cooler, when the coolant temperature is less than the threshold coolant temperature.

In addition, the thermostat valve may include a temperature sensor so that adjusting the position of the thermostat valve is based on the coolant temperature and may occur automatically without actuation from a controller when the coolant temperature transitions above or below the threshold temperature.

The method may further comprise adjusting a wastegate disposed in a bypass passage around a turbine of the turbocharger in response to one or more of the coolant temperature transitioning above or below the threshold temperature and the thermostat valve changing positions between the first and second positions.

In one embodiment, the system provided herein provides for a turbocharger including a compressor driven by a turbine through a rotating shaft, a liquid-cooled charge air cooler (CAC) positioned downstream of the compressor, and a coolant pump positioned in a coolant circuit flowing coolant to the CAC. Furthermore, the coolant pump may be mechanically coupled to and driven by the rotating shaft. In an example, the coolant pump is the only coolant pump in the circuit and includes an impeller directly coupled to the rotating shaft. In one embodiment, the impeller is directly coupled to a portion of the rotating shaft extending axially outward from the compressor and away from turbine. In another example, the impeller is directly coupled to the rotating shaft at a location between the compressor and the turbine. In yet another example, no impeller is provided. Instead, the rotating shaft and the coolant pump may each have complementary and interlocking gears, where rotation of the rotating shaft is translated into rotation of the coolant pump through the complementary and interlocking gears or some other embodiment of a pump drive system.

Furthermore, in one embodiment, the system disclosed herein includes a low-temperature radiator coupled downstream of the CAC and upstream of the coolant pump in the coolant circuit. In an example, a thermostat valve coupled downstream of the CAC and the low-temperature radiator in the coolant circuit may also be provided. In another example, the thermostat valve is adjustable between a first position directing coolant through the CAC, low-temperature radiator, and the coolant pump, and a second position directing coolant through a bypass passage bypassing the CAC and low-temperature radiator and to the coolant pump. In another embodiment, the thermostat valve may be an electronic proportional flow control valve.

In another embodiment, the system may include a wastegate disposed in a bypass passage around the turbine. The wastegate may be regulated by a controller with computer readable instructions for decreasing an opening of the wastegate during a first condition when the thermostat valve is transitioning from the second position. On the other hand, during a second condition when the thermostat valve is transitioning from the first position to the second position, the controller may instruct the wastegate to increase an opening of the wastegate.

In addition, a method for driving coolant through a charge air cooler with a coolant pump is provided herein. In this example, the coolant pump may be mechanically driven by a turbocharger. The method may also provide for adjusting a position of a wastegate disposed in a bypass passage around a turbine of the turbocharger in response to a changing coolant load of the coolant pump.

In one embodiment, the charge air cooler and the coolant pump may be positioned in a charge air cooling loop. The charge air cooling loop may also include a low-temperature radiator and a thermostat valve with a temperature sensor configured to measure a coolant temperature. Moreover, the thermostat valve may be adjusted into a first position where the coolant flows through the charge air cooler, the low-temperature radiator and the coolant pump in response to the coolant temperature increasing above a threshold temperature. In another example, the thermostat valve may be adjusted into a second position where coolant bypasses the charge air cooler and low-temperature radiator. Instead, the coolant may flow through a bypass passage to the coolant pump in response to the coolant temperature decreasing below the threshold temperature.

In addition, the method may further comprise determining the changing coolant load of the coolant pump based on a changing position of the thermostat valve. In one example, the coolant load increases responsive to the thermostat valve transitioning from the second positon to the first position. In another example, the coolant load decreases responsive to the thermostat valve transitioning from the first position to the second position. Further still, the method may include decreasing an amount of opening of the wastegate responsive to increasing coolant load of the coolant pump and increasing the amount of opening of the wastegate responsive to decreasing coolant load of the coolant pump.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-3, 1-6, V-8, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting a coolant flow through a charge air cooler with a single coolant pump based on turbocharger speed, the single coolant pump mechanically driven by rotative power from a turbocharger; and
adjusting a position of a thermostat valve disposed downstream of the charge air cooler in a charge air cooling circuit based on a coolant temperature of coolant circulating through the charge air cooling circuit, the charge air cooling circuit including the single coolant pump, where the adjusting the position of the thermostat valve includes:
 adjusting the thermostat valve into a first position where coolant flows from an outlet of the charge air cooler, through a low-temperature radiator, to the single coolant pump, and then through the charge air cooler, when the coolant temperature of coolant circulating through the charge air cooling circuit is greater than a threshold coolant temperature; and
 adjusting the thermostat valve into a second position where coolant flow bypasses the charge air cooler and flows directly from an inlet of the charge air cooler and to the single coolant pump without flowing through the low-temperature radiator and the charge air cooler, when the coolant temperature is less than the threshold coolant temperature.

2. The method of claim 1, further comprising:
increasing the coolant flow to the charge air cooler as the turbocharger speed increases; and
decreasing the coolant flow to the charge air cooler as the turbocharger speed decreases.

3. The method of claim 2, further comprising increasing charge air flow from a compressor of the turbocharger as turbocharger speed increases and decreasing charge air flow from the compressor as turbocharger speed decreases, wherein the compressor is positioned upstream from the charge air cooler.

4. The method of claim 1, further comprising driving an impeller of the single coolant pump to pump coolant through the charge air cooling circuit to the charge air cooler with a rotating shaft of the turbocharger, wherein the impeller is operably coupled to the rotating shaft.

5. The method of claim 1, wherein the thermostat valve includes a temperature sensor and wherein adjusting the position of the thermostat valve based on the coolant temperature includes automatically adjusting the position of the thermostat valve without actuation from a controller when the coolant temperature transitions above or below the threshold temperature.

6. The method of claim 5, further comprising adjusting a wastegate disposed in a bypass passage around a turbine of the turbocharger in response to one or more of the coolant temperature transitioning above or below the threshold temperature and the thermostat valve changing positions between the first and second positions.

7. A system for an engine, comprising:
a turbocharger including a compressor driven by a turbine through a rotating shaft;
a liquid-cooled charge air cooler (CAC) positioned downstream of the compressor;
a low-temperature radiator positioned downstream of the CAC to dissipate heat;
a coolant pump positioned in a coolant circuit flowing coolant to the CAC, the coolant pump mechanically coupled to and driven by the rotating shaft;
the low-temperature radiator coupled downstream of the CAC and upstream of the coolant pump in the coolant circuit; and
a thermostat valve coupled downstream of the CAC and the low-temperature radiator in the coolant circuit, the thermostat valve adjustable between a first position directing coolant through the CAC, the low-temperature radiator, and the coolant pump, and a second position directing coolant through a bypass passage bypassing the CAC and low-temperature radiator and to the coolant pump.

8. The system of claim 7, wherein the coolant pump includes an impeller directly coupled to the rotating shaft, where the impeller rotates with rotation of the rotating shaft and wherein the coolant pump is an only coolant pump in the coolant circuit.

9. The system of claim 8, wherein the impeller is directly coupled to a portion of the rotating shaft extending axially outward from the compressor and away from the turbine.

10. The system of claim 8, wherein the impeller is directly coupled to the rotating shaft at a location between the compressor and the turbine.

11. The system of claim 7, further comprising:
a wastegate disposed in a bypass passage around the turbine; and
a controller with computer readable instructions for:
 during a first condition when the thermostat valve is transitioning from the second position to the first position, decreasing an opening of the wastegate; and
 during a second condition when the thermostat valve is transitioning from the first position to the second position, increasing an opening of the wastegate.

12. The system of claim 7, wherein the rotating shaft and the coolant pump each have complementary and interlocking gears, where rotation of the rotating shaft is translated into rotation of the coolant pump through the complementary and interlocking gears.

13. A method for an engine, comprising:
driving coolant through a charge air cooler with a coolant pump, the coolant pump mechanically driven by a turbocharger; and
adjusting a position of a wastegate disposed in a bypass passage around a turbine of the turbocharger in response to a changing coolant load of the coolant pump, wherein the charge air cooler and the coolant pump are positioned in a charge air cooling loop, the charge air cooling loop further including a low-temperature radiator and a thermostat valve including a temperature sensor configured to measure a coolant temperature and further comprising adjusting the thermostat valve into a first position where coolant flows through the charge air cooler, the low-temperature radiator, and the coolant pump in response to the coolant temperature increasing above a threshold temperature and adjusting the thermostat valve into a second position where coolant bypasses the charge air cooler and low-temperature radiator and flows through a bypass passage to the coolant pump in response to the coolant temperature decreasing below the threshold temperature.

14. The method of claim 13, further comprising determining the changing coolant load of the coolant pump based on a changing position of the thermostat valve, where the coolant load increases responsive to the thermostat valve transitioning from the second positon to the first position and the coolant load decreases responsive to the thermostat valve transitioning from the first position to the second position.

15. The method of claim 14, further comprising decreasing an amount of opening of the wastegate responsive to increasing coolant load of the coolant pump and increasing the amount of opening of the wastegate responsive to decreasing coolant load of the coolant pump.

* * * * *